Inventor
Gillis R. Johansson
By
Wenderoth, Lind & Ponack
Attorneys

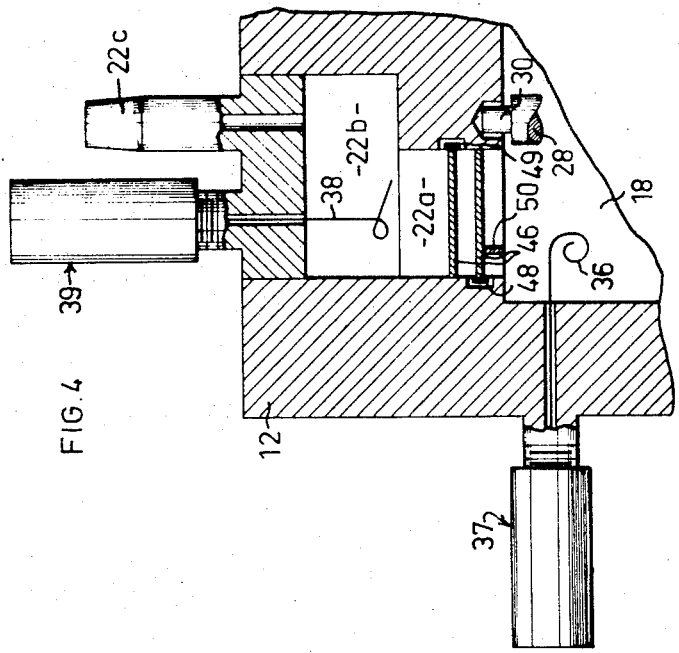
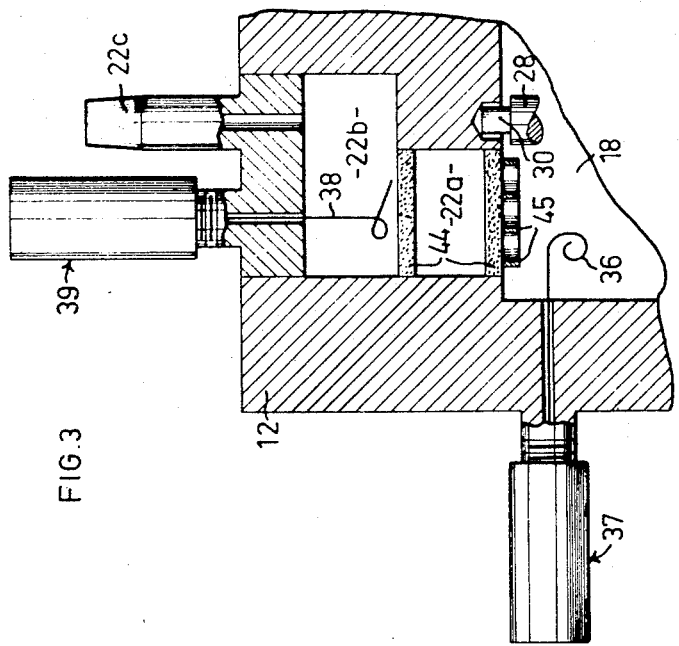

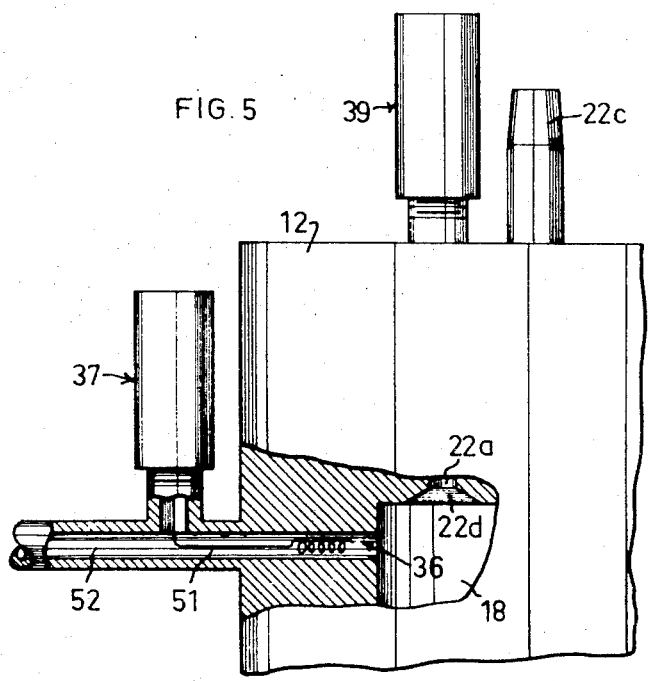

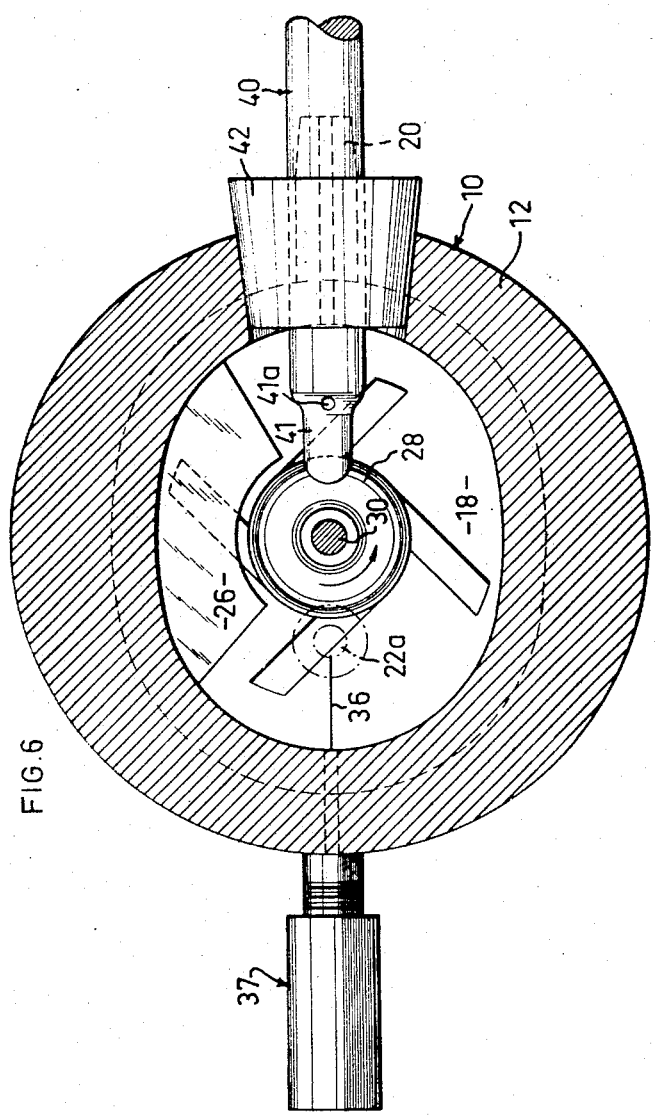

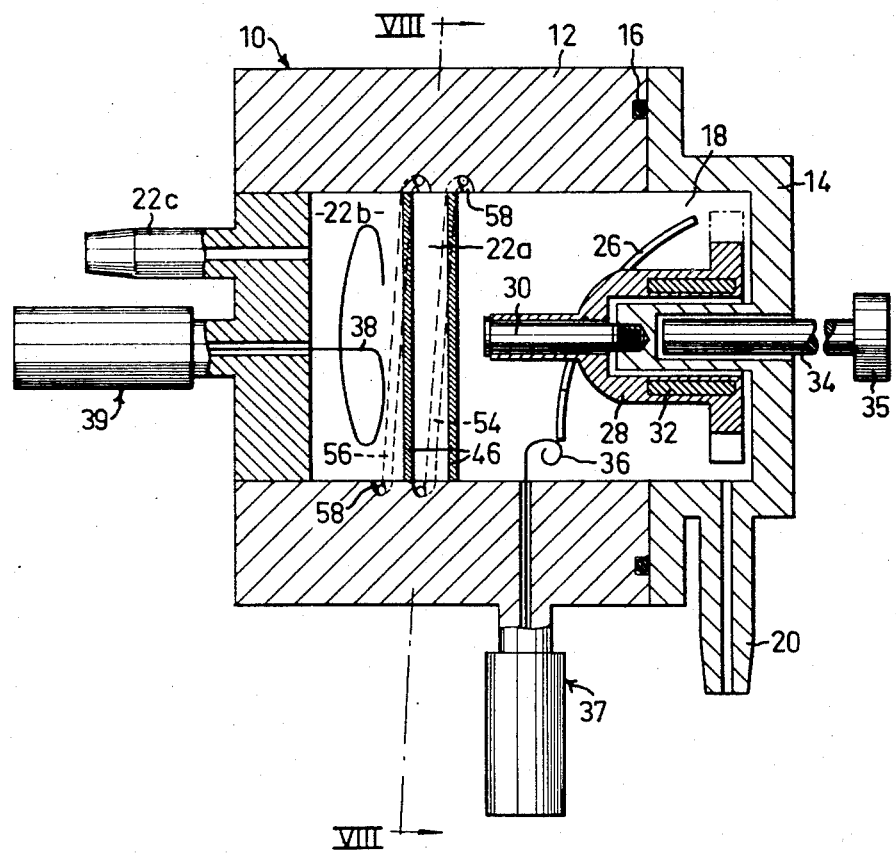

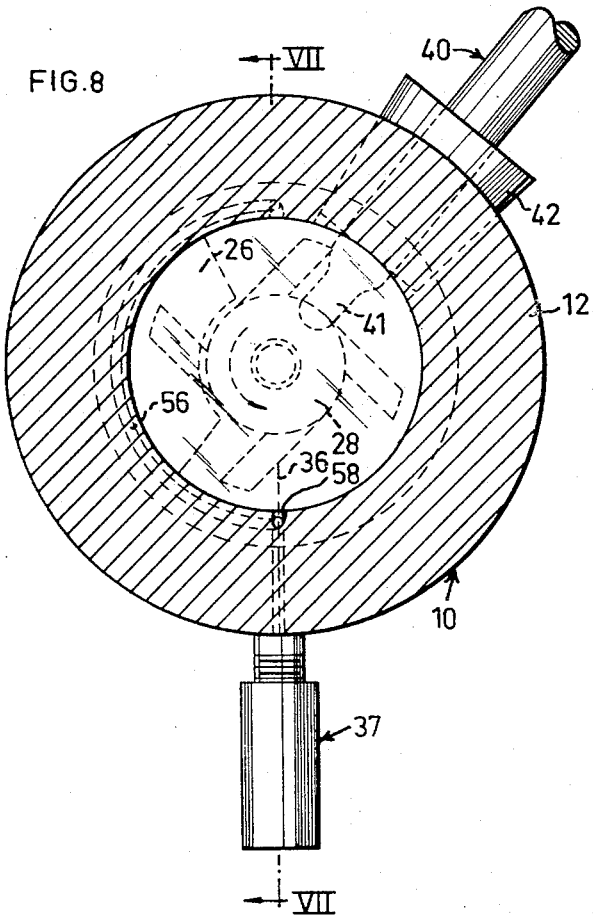

United States Patent Office 3,438,872
Patented Apr. 15, 1969

3,438,872
METHODS OF PERFORMING COULOMETRIC TITRATION OF FLOWING FLUIDS AND AN APPARATUS THEREFOR
Gillis Rune Johansson, Lund, Sweden, assignor, by mesne assignments, to Jungner Instrument AB, Stockholm, Sweden, a Swedish joint-stock company
Filed Oct. 18, 1965, Ser. No. 497,105
Claims priority, application Sweden, May 5, 1965, 5,866/65
Int. Cl. B01k *3/00;* G01n *31/16*
U.S. Cl. 204—1
9 Claims

ABSTRACT OF THE DISCLOSURE

A method and apparatus for performing coulometric titration of flowing fluids, fed through a round chamber during vigorous agitation, wherein the flow of fluid in the chamber follows a helical path and the fluid during its flow along the wall of the chamber first contacts a working electrode, then a measuring electrode system and then, after leaving the chamber through an outlet, an auxiliary electrode, and wherein the amount of Coulombs supplied by the working electrode and the auxiliary electrode is measured and the end point of the titration is determined by means of the measuring electrode system. The apparatus for use in the coulometric titration of flowing fluids, has a round chamber with an agitator adjacent one end wall, an inlet adjacent the agitator, and a baffle extending helically along the wall of the chamber. An outlet is provided at the end wall opposite the agitator. The apparatus also has a working electrode and a measuring electrode system in the chamber at the outlet end thereof and an auxiliary electrode in the outlet from the chamber.

---

It is previously known to perform coulometric titration by contacting the medium to be titrated with two pairs of electrodes, viz., a titration electrode system comprising a working electrode and an auxiliary electrode, and a measuring electrode system comprising an indicator electrode and a reference electrode and measuring for example the pH-value, redox potential, metal ion concentration, or the like. Coulometric titration is characterized in that the current generates reagent at the working electrode from a substance present in excess in the solution in which the electrode is immersed. With platinum electrodes there are thus generated hydrogen ions (and oxygen) at the anode and hydroxyl ions (and hydrogen) at the cathode unless substances are present which can be oxidized and reduced, respectively, at lower potentials. When for instance bromide ions are present, bromine is generated at the anode at a potential lower than that at which hydrogen ions are generated. Unless the current density is allowed to become too high solely bromine is generated in a bromide solution and consequently no hydrogen ions. If for instance the anode is of silver and the solution does not contain any substances more readily oxidizable than silver, solely silver ions are generated at the anode. The silver ions can be used for performing argentometric titration. Such a coulometric titration is usually performed batchwise with small sample quantities of the medium to be titrated to permit performing the titration accurately and to obtain a satisfactory degree of accuracy at the titration. At a continuous analysis of a flow of the medium difficulties arise, however, int. al. because part of the flow of the medium may escape through the outlet of the titration apparatus or cell before the end point of the titration has been reached. Particularly great difficulties have been encountered when the coulometric analysis has been performed as a pH-titration and the measuring electrode system has comprised a reference electrode of, e.g., Ag/AgCl and an indicator electrode in the form of a glass electrode. The batchwise analysis has often been carried out with a constant electrolysis current which has generated reagent until the end point of the titration has been reached, the product of current and time being a measure of the amount of titrated substance in the sample. The current can be interrupted while the measuring electrodes take equilibrium, the solution is mixed and reading is effected. A sufficient number of interruptions in the generation can be made in order that so many measuring points shall be obtained that the end point of the titration can be determined graphically or numerically. In a continuous analysis such a procedure entails great difficulties and low accuracy. To achieve a favorable accuracy it must be possible to adapt the current in such a way that a sufficient amount of reagent is generated in order that the solution shall always have a composition corresponding to the end point of the titration.

The object of the invention therefore is to provide a method and an apparatus or cell for performing an accurate titration of flowing media, and the present invention is based on the conception that the flow medium must be subjected at the titration to vigorous agitation simultaneously as it has to be ensured that as small an amount as possible of the medium is allowed to escape through the outlet of the titration cell before the end point of the titration has been reached. The prior-art forms of the titration vessel have not ensured a rapid mixing of the reagent with the solution and a favorable agitation at the electrodes, which resulted in reduced accuracy at the titration of continuously flowing media, and the space for the auxiliary electrode has not either been designed such that the titration can proceed for a longer time without inspection. These drawbacks, however, have been eliminated in the method and the cell according to the invention.

The present invention thus relates to a method of performing coulometric titration of flowing media, in which a medium to be titrated is contacted under agitation with a titration electrode system comprising a working electrode and an auxiliary electrode, and with a measuring electrode system comprising an indicator electrode and a reference electrode, the end point of the titration being determined with the aid of the measuring electrode system and the number of Coulombs consumed at the titration supplied through the titration electrode system being measured. According to the invention this method is characterized by the steps of feeding the medium through an inlet at one end of a round chamber in the vicinity of an agitating means rotating in the chamber and vigorously agitating the medium and causing it to flow along the round wall of the chamber and into contact with baffle means approximately helically extending along part of the periphery of the round wall and projecting into the chamber, said baffle means causing the medium to flow towards the working electrode and farther along the round wall of the chamber past the indicator electrode and reference electrode of the measuring electrode system, and finally causing the medium to flow out of the chamber through an outlet disposed at the end of the chamber opposed to the inlet and then into contact with the auxiliary electrode of the titration electrode system.

The apparatus or cell intended for carrying the above method into effect includes a titration electrode system comprising a working electrode and an auxiliary electrode, a measuring electrode system comprising an indicator electrode and a reference electrode, an inlet, an outlet, and agitating means for agitation of a medium passed through the apparatus or cell for titration. According to the invention this apparatus or cell is characterized by the fact that it has a round chamber in which the agitating means is adapted to rotate at one end wall of the chamber and in which the inlet opens in the vicinity of the agitating means, that the working electrode and the measuring electrode system are disposed at the end of the chamber opposed to the inlet, that approximately helically extending baffle means projecting into the chamber is arranged on the round wall of the chamber along part of said wall, that the outlet is provided at the end of the chamber opposed to the inlet, and that the auxiliary electrode of the titration electrode system is arranged in the outlet outside the round chamber. The round chamber of said cells is preferably approximately helically but it may also have an oval or elliptical cross section. In some cases the oval or elliptical cross sectional form may offer certain advantages with respect to the agitation of the medium in the cell.

It should be mentioned in this connection that it is possible to use in the method and together with the cell, respectively, according to the invention any conventional electric system whatever for coulometric titration. However, a preferred electric system is described in my copending patent application Ser. No. 496,936, filed Oct. 18, 1965.

The method and the cell according to the invention can be used for both titration of a liquid or solution and titration of a gas or gas mixture.

The above and further features of the invention and the advantages gained thereby will become apparent from the following detailed description in which reference is made to the accompanying drawings.

In the drawings:

FIGS. 3–5 show modifications of the cell in FIGS. 1 and 2 and parts of axial sections of the respective modifications;

FIG. 6 shows a modification of the cell in FIGS. 1 and 2 and is a section, corresponding to FIG. 2, of this modified cell;

FIG. 7 is a vertical section of a cell according to the invention specifically suited for the titration of gas, the section being taken on line VII—VII in FIG. 8;

FIG. 8 is a section on line VIII—VIII in FIG. 7.

Figure 1:
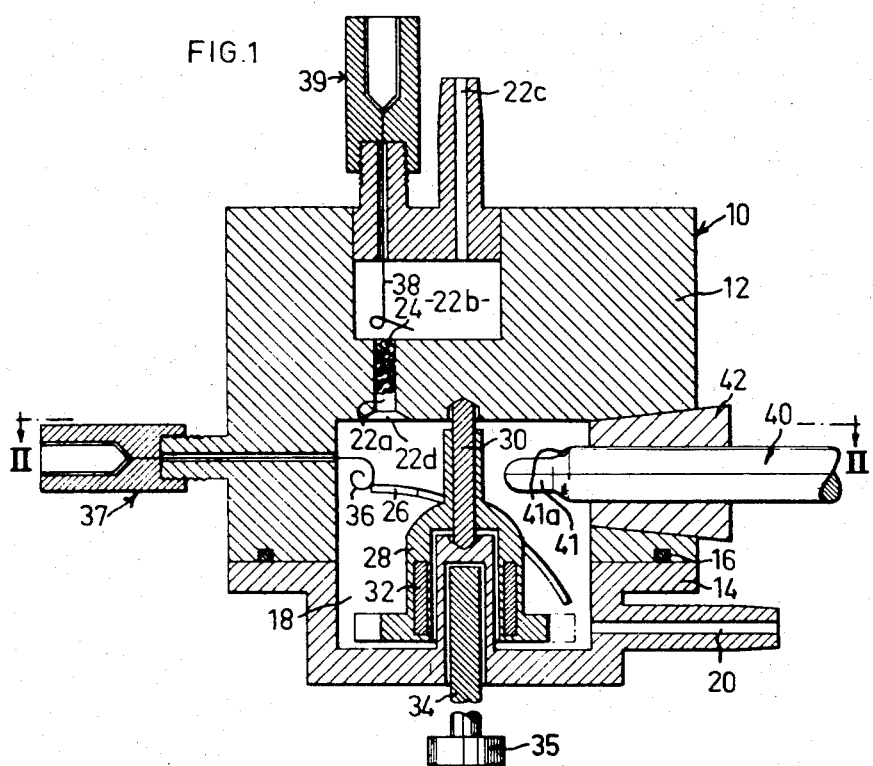
FIG. 1 is an axial section of a cell according to the invention.
Figure 2:
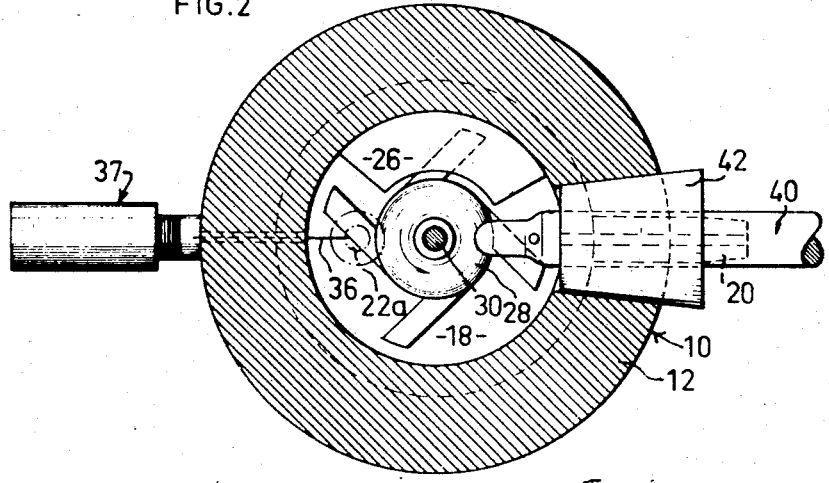
FIG. 2 is a section substantially on line II—II in FIG. 1.

The cell according to the invention has a housing 10 of electrically insulating material including an upper portion 12 and a lower portion 14. The two portions of the housing are interconnected in a suitable manner and sealed in relation to each other by means of a sealing ring 16. The housing 10 contains a round chamber 18 which in the embodiment shown in FIG. 2 is substantially cylindrical and in the embodiment shown in FIG. 6 is substantially elliptical or oval, an inlet 20 opening into the lower end of the chamber 18. In the upper end wall of the chamber 18 an outlet 22 opens at a point which in the embodiment shown in FIGS. 1 and 2 is approximately diametrically opposed to the point where the inlet 20 opens into the chamber 18. The outlet has a first portion 22a, a widened portion 22b, and an outlet socket 22c. In this embodiment the outlet has a counter-sunk portion 22d at its entrance end. The function of this counter-sunk portion will become apparent in the following. In the embodiments shown in FIGS. 1 and 2 a flow damping plug 24 of, e.g., glass wool is disposed in the narrow portion 22a of the outlet. Approximately helically extending baffle means 26 projecting into the chamber 18 is mounted on the cylindrical wall of said chamber. Beneath the baffle means 26 in the chamber 18 there is mounted a rotatable agitating means in the form of a centrifugal pump impeller 28 disposed on a shaft 30 which is rotatable in recesses in the upper and lower portions 12 and 14, respectively, of the housing 10. The agitating means 28 is magnetically coupled by means of magnetic inserts 32 to a drive shaft 34 which is driven by a motor 35 in the direction indicated. This motor may be an asynchronous motor driving the impeller 28 at for instance 2600 r.p.m. If desired, a gearing can be inserted between the motor 35 and the shaft 34 for varying the r.p.m. of the shaft 34 and the agitating means 28. Of course, the shaft 34 and the agitating means 28 can also be coupled otherwise than magnetically. However, care should be taken also in this case that the chamber 18 is thoroughly sealed.

The agitating means 28 need not be an impeller but can also be for instance a propeller. The important thing is, however, that the agitating means is capable of providing a vigorous agitation of the medium and can cause it to flow along the cylindrical wall of the chamber 18.

The two electrode systems of the cell are located in the upper portion 12 of the housing 10. The titration electrode system of the cell comprises a working electrode 36 and an auxiliary electrode 38 while the measuring electrode system of the cell comprises a combination electrode 40 having on one hand a measuring electrode 41 in the form of a so-called glass electrode and on the other hand a reference electrode 41a. These two electrodes are not, however, shown in detail in the drawings since combination electrodes of this type are well known to those skilled in the art. The working electrode 36 and the auxiliary electrode 38 each have one electric connection 37 and 39, respectively. The combination electrode 40 and the working electrode 36 are disposed on diametrically opposite sides of the chamber 18. The combination electrode 40 is held in position by a rubber plug 42 inserted in a hole in the cylindrical wall of the housing portion 12.

For performing a coulometric titration of flowing media with the above cell by the method according to the present invention, the medium to be titrated is supplied through the inlet 20 of the apparatus, the medium being vigorously agitated by the rapidly rotating impeller 28 and being caused to flow along the cylindrical wall of the chamber 18 and into contact with the baffle means 26. Said baffle means 26 causes the medium to flow towards the working electrode 36 and farther along the cylindrical wall of the chamber 18 past the measuring electrode system 40 whereupon the medium continues to flow along the cylindrical wall to the outlet 22 above the working electrode 36. The counter-sunk portion 22d at the entrance end of the outlet 22 functions as a dead space in which the flow of the medium is slightly decelerated before the medium flows in an upward direction through the glass wool plug 24 into the widened portion 22b. As will be explained in the following, decelerating the flow of the medium in this manner is particularly suitable when the titration is carried out as a pH-titration. In the widened portion 22b of the outlet 22 the medium contacts the auxiliary electrode of the titration electrode system and finally the medium leaves the apparatus through the outlet socket 22c.

At the continuous coulometric titration it is of the utmost importance that the medium be subjected to vigorous agitation in the confined space so that the end point of the titration determined by the measuring electrode system is reached as accurately as possible. At the same time, however, it is important that excess reagent possibly produced by the titration electrode system flows directly to the measuring electrode system so that no reagent is lost by escape through the outlet 22 together with medium already titrated. The method according to the present invention fulfills these requirements, for the vigorous agitation is ensured by the agitating means 28 while the baffle means 26 has the purpose of directing the flow of medium in such a way that the medium and the excess reagent, if any, will flow from the working electrode to the measuring electrode system before the medium leaves the apparatus through the outlet.

To attain a satisfactory accuracy at the titration the volume of the chamber 18 shall be large with respect to the rate of flow of the medium through the cell. The volume of the chamber 18 must not, however, be so large that it is not possible to obtain an exactly defined end point at the titration. In the embodiment shown in FIGS. 1 and 2 of the cell according to the invention it has proved suitable to make the chamber 18 about thirty times larger than the volume of the medium passing per minute through the cell. In this case it is possible to perform a pH-titration with a degree of accuracy of ±0.1%.

The glass wool plug 24 which as regards function is a flow damping means has for its purpose to exert a certain resistance to the flow of the medium through the outlet so that a certain excess pressure is obtained in the chamber 18. However, the glass wool plug 24 also has another important function, viz., to make it more difficult for the reagent forming at the auxiliary electrode to migrate to the chamber 18 or prevent it from doing so, for in such a case erroneous measured values might be obtained. However, other flow damping means can be substituted for this glass wool plug 24, and in the embodiment of FIG. 3 two sintered glass disks 44 are substituted for said plug 24. Secured to the underside of the lower sintered glass disk 44 are two circular baffle walls 45 which are the equivalent of the counter-sunk portion 22d in the embodiment of FIG. 1 and thus serve to provide a dead space in which the flow of the medium along the substantially circular wall of the chamber 18 is decelerated before the medium leaves the apparatus through the outlet 22.

In FIG. 4 another flow damping means is shown which can be utilized in the passage 22a of the outlet 22. This flow damping means comprises two ion exchange diaphragms 46 which may be for instance 0.5–1 mm. thick and which are spaced a short distance apart in the passage 22a of the outlet 22. Passages 48, 49 lead the medium from the chamber 18 via the gap between the ion exchange diaphragms 46 to the portion of the passage 22a above said ion exchange diaphragms. The passages 48, 49 are arranged at diametrically opposite sides of the passage 22a so that a certain resistance is offered to the flow of the medium from the chamber 18 to the widened portion 22b. Beneath the lower ion exchange diaphragm 46 a baffle wall 50 is disposed opposite the passage 48 so that a dead space is provided also in this embodiment.

In the embodiment shown in FIGS. 1 and 2 of the cell according to the invention the inlet 20 radially opens into the chamber 18. By this arrangement the inlet pressure in the inlet 20 will be relatively low but if it is desired further to lower the inlet pressure the inlet may be adapted to open obliquely into the chamber 18, in which case the inlet shall be directed in the same sense in which the medium is caused to flow along the cylindrical wall of the chamber 18. In the embodiment shown in FIGS. 1 and 2 where the impeller 28 rotates counter-clockwise, the inlet 20 would thus be turned so as to open obliquely upwardly to the left as viewed in FIG. 2. The inlet 20 may possibly be adapted to open tangentially into the chamber 18 or to open into the end wall of the chamber 18.

When the cell according to the invention is used for pH-titration, the titration electrode system, i.e., the working electrode 36 and the auxiliary electrode 38, may consist of platinum, gold, or any other suitable material. The measuring electrode system 40 may then have a reference electrode of Ag/AgCl or calomel, while the indicator electrode may be a so-called glass electrode. On the other hand, if the cell is used for measuring of, e.g., chloride, the working electrode and the auxiliary electrode may consist of, e.g., silver while the indicator electrode is for instance of silver and the reference electrode of mercury sulfate which via a mercury body is electrically connected to a contact point of, e.g., platinum.

When disturbing secondary reactions between the working electrode and substances from the medium to be titrated can be expected at the working electrode during titration, use may be made of the so-called outer generation of reagent. A design of the working electrode 36 useful for this purpose is shown in FIG. 5. An electrode 51 of, e.g., platinum is located in an electrode inlet passage 52 which is connected to a pump (not shown) and through which an electrolyte, e.g., a solution of sodium sulfate is pumped into the chamber 18. In this case the electrolyte flow or jet serves as the working electrode 36 proper. At this outer generation of reagent the metal electrode 51 does not get in direct contact with the medium to be titrated but is in indirect contact with the medium by the intermediary of the electrolyte.

When the titration is performed as a pH-titration small gas bubbles are produced at the working electrode 36, and the agitation shall be so vigorous that these gas bubbles are not given the time to form large bubbles until the titration medium reaches the dead space constituted by the counter-sunk portion 22d, the baffle walls 46, or the baffle wall 50. The purpose of the dead space thus is to give the gases time to form large bubbles to facilitate the escape of the gases from the chamber 18 and to prevent accumulation of gases in the cell.

An embodiment of the cell according to the invention particularly suitable for coulometric titration of gases is shown in FIGS. 7 and 8. As will appear from these figures the cell has a great similarity wtih the other embodiments illustrated, the housing 10 of the cell being, however, turned about 90° so that the axis of the substantially cylindrical chamber 18 is approximately horizontal. In this embodiment the agitating means 28 has been mounted by means of a pivot pin 30 of a configuration slightly differing from that of the pivot pin in the embodiment described above. Thus the agitating means 28 rotated in relation to the pivot pin 30 which is provided with a head at one end and with threads at the other end, said other end being screwed into the part 14 of the housing. Further, the inlet 20 has been arranged at the lower end of the cell, i.e., on the same side of the chamber 18 as the working electrode 36, to thereby facilitate the flow of the medium through the cell. At the left end as viewed in FIG. 8 the chamber 18 is defined by two ion exchange diaphragms 46 similar to the diaphragms 46 in the embodiment in FIG. 4 but extending cross the entire cross sectional area of the chamber 18. The ion exchange diaphragms allow an electric current to pass at low resistance so that an electric current path can be established between the working electrode 36 and the auxiliary electrode 38 which as before is arranged in the portion 22b of the outlet 22. Like in the embodiment of FIG. 4 passages 54, 56 are provided to lead the medium from the chamber 18 via the gap 22a between the ion exchange diaphragms 46 to the portion 22b of the outlet. These passages thus serve the same purpose as the passages 48 and 49 in the embodiment according to FIG. 4 but they are formed in a slightly different manner. Thus the passage 54 extends from the upper part of the chamber 18 in the immediate vicinity of the first diaphragm 46 and reaches in the interior of the wall of the housing portion 12 down to the lower part of the portion 22a between the diaphragms 46. The passage 56 in a similar manner extends from the upper part of the portion 22a and reaches down to the lower part of the portion 22b inside the other diaphragm 46. To facilitate the introduction of the medium the passages 54, 56 have bell-shaped inlets and outlets 58.

It may be suitable also in the embodiment according to FIGS. 7 and 8 to select a substantially elliptical or oval cross sectional form for the chamber 18, as certain advantages may thereby be attained regarding the agitation of the medium in the cell.

At coulometric titration of gas by means of the cell shown in FIGS. 7 and 8 the gas to be analyzed is supplied by a pump (not shown) through the inlet 20 in the form of a suspension of small gas bubbles in a fluid medium serving as electrolyte. As a result of the vigorous agitation by the agitating means 28 the suspension is retained in the chamber 18. The substance to be titrated contained in the gas is dissolved in the fluid medium and can therefore be titrated with the aid of the titration electrode system 36, 38 while the end point of the titration is determined by means of the measuring electrode system 40 in the same way as in the above described embodiments of the cell according to the invention. It may be mentioned by way of example that it is possible to titrate sulfur dioxide present in a gas, e.g., air with the aid of a fluid medium serving as electrolyte and consisting of a 0.5 molar sodium sulfate aqueous solution, the rate of flow of the gas through the cell being for instance 10 ml. per minute and the rate of flow of the fluid medium for instance 5 ml. per minute or 10 ml. per minute. A suitable volume for the chamber 18 thus is 450–600 ml. Also in the coulometric titration of gases by means of the cell according to the invention it is possible to reach a degree of accuracy of ±0.1%.

What I claim and desire to secure by Letters Patent is:

1. A method of performing coulometric titration of flowing fluids, comprising the steps of feeding a fluid medium to be titrated into a substantially round chamber at one end thereof and adjacent agitator means therein, rotating the agitator means to vigorously agitate the fluid medium, bringing the fluid medium to flow along a helical path extending along the wall of the chamber, bringing the fluid medium during its flow along the helical path first into contact with a working electrode extending into the chamber from the wall thereof and then into contact with a measuring electrode system extending into the chamber from the wall thereof and comprising an indicator electrode and a reference electrode, withdrawing the fluid medium from the chamber through an outlet at the other end thereof, contacting the fluid medium with an auxiliary electrode outside the chamber and in the outlet therefrom, the working electrode and the auxiliary electrode comprising a titration electrode system, causing an electric current to flow between the working electrode and the auxiliary electrode through the outlet from the chamber, determining the end point of the titration by means of the measuring electrode system, and measuring the amount of Coulombs supplied by the titration electrode system.

2. A method of performing coulometric titration of flowing fluids, comprising the steps of feeding a fluid medium to be titrated into a substantially round chamber at one end thereof and adjacent agitator means therein, rotating the agitator means to vigorously agitate the fluid medium, bringing the fluid medium to flow along a helical path extending along the wall of the chamber, bringing the fluid medium during its flow along the helical path first into contact with a working electrode extending into the chamber from the wall thereof and then into contact with a measuring electrode system extending into the chamber from the wall thereof and comprising an indicator electrode and a reference electrode, decelerating the flow of the fluid medium along the wall of the chamber after said step of bringing the fluid medium into contact with the measuring electrode system, withdrawing the fluid medium from the chamber through an outlet at the other end thereof after said step of decelerating the flow of the fluid, contacting the fluid medium with an auxiliary electrode outside the chamber and in the outlet therefrom, the working electrode and the auxiliary electrode comprising a titration electrode system, causing an electric current to flow between the working electrode and the auxiliary electrode through the outlet from the chamber, determining the end point of the titration by means of the measuring electrode system, and measuring the amount of coulombs supplied by the titration electrode system.

3. An apparatus for use in the coulometric titration of flowing fluids, having wall means defining a substantially round chamber, rotatable agitator means adjacent one end wall of the chamber, means defining an inlet to the chamber and arranged adjacent said agitator means, baffle means arranged substantially helically on said chamber-defining wall means and extending along at least a part thereof and projecting into the chamber, means defining an outlet from the chamber and arranged at the end wall of the chamber opposite said rotatable agitator means, a working electrode in the chamber, an auxiliary electrode in said outlet defining means outside the chamber, said working electrode and said auxiliary electrode forming a titration electrode system, and a measuring electrode system, comprising an indicator electrode and a reference electrode and arranged in the chamber at the end thereof opposite said inlet defining means, said working electrode and said measuring electrode system being arranged substantially opposite each other at the end of the chamber opposite said agitator means.

4. An apparatus for use in the coulometric titration of flowing fluids, having wall means defining a substantially round chamber, rotatable agitator means adjacent one end wall of the chamber, means defining an inlet to the chamber and arranged adjacent said agitator means, baffle means arranged substantially helically on said chamber-defining wall means and extending along at least a part thereof and projecting into the chamber, means defining an outlet from the chamber and arranged at the end wall of the chamber opposite said rotatable agitator means, a working electrode in the chamber, an auxiliary electrode in said outlet defining means outside the chamber, said working electrode and said auxiliary electrode forming a titration electrode system, and a measuring electrode system comprising an indicator electrode and a reference electrode and arranged in the chamber at the end thereof opposite said inlet defining means, said inlet defining means and said working electrode being arranged substantially opposite each other and at opposite ends of said chamber-defining means.

5. An apparatus for use in the coulometric titration of flowing fluids, having wall means defining a substantially round chamber, rotatable agitator means adjacent one end wall of the chamber, means defining an inlet to the chamber and arranged adjacent said agitator means, baffle means arranged substantially helically on said chamber-defining wall means and extending along at least a part thereof and projecting into the chamber, a working electrode in the chamber, means defining an outlet from the chamber and arranged at the end wall of the chamber opposite said rotatable agitator means and above said working electrode, an auxiliary electrode in said outlet-defining means outside the chamber, said working electrode and said auxiliary electrode forming a titration electrode system, baffle means for decelerating the flow of fluid to said outlet defining means and arranged adjacent said outlet defining means, and a measuring electrode system comprising an indicator electrode and a reference electrode and arranged in the chamber at the end thereof opposite said inlet defining means.

6. An apparatus for use in the coulometric titration of flowing fluids, having wall means defining a substantially round chamber, rotatable agitator means adjacent one end wall of the chamber, means defining an inlet to the chamber and arranged adjacent said agitator means, baffle means arranged substantially helically on said chamber-defining wall means and extending aong at least a part thereof and projecting into the chamber, a working electrode in the chamber, means defining an outlet from the chamber and arranged at the end wall of the chamber opposite said rotatable agitator means and above said working electrode, an auxiliary electrode in said outlet defining means outside the chamber, said working electrode and said auxiliary electrode forming a titration electrode system, baffle means for decelerating the flow of fluid to said outlet defining means and arranged adjacent said outlet defining means, flow damping means in said outlet defining means ahead of said auxiliary electrode, and a measuring electrode system comprising an indicator electrode and a reference electrode and arranged in the chamber at the end thereof opposite said inlet defining means.

7. An apparatus for use in the coulometric titration of flowing fluids, having wall means defining a substantially round chamber, rotatable agitator means adjacent one end wall of the chamber, means defining an inlet to the chamber and arranged adjacent said agitator means, baffle means arranged substantially helically on said chamber-defining wall means and extending along at least a part thereof and projecting into the chamber, means defining an outlet from the chamber and arranged at the end wall of the chamber opposite said rotatable agitator means, a working electrode projecting into the chamber from the wall thereof, an auxiliary electrode in said outlet defining means outside the chamber, said working electrode and said auxiliary electrode forming a titration electrode system and being electrically interconnected through said outlet defining means and the fluid therein, and a measuring electrode system projecting into the chamber from the wall thereof and comprising an indicator electrode and a reference electrode and arranged in the chamber at the end thereof opposite said inlet defining means.

8. An apparatus for use in the coulometric titration of flowing fluids, having wall means defining a substantially round chamber, rotatable agitator means adjacent one end wall of the chamber, means defining an inlet to the chamber and arranged adjacent said agitator means, baffle means arranged substantially helically on said chamber-defining wall means and extending along at least a part thereof and projecting into the chamber, means defining an outlet from the chamber and arranged at the end wall of the chamber opposite said rotatable agitator means, means defining an electrode inlet duct, a working electrode in said electrode inlet duct defining means, an auxiliary electrode in said outlet defining means outside the chamber, said working electrode and said auxiliary electrode forming a titration electrode system and being electrically interconnected through said outlet defining means and the fluid therein, and a measuring electrode system projecting into the chamber from the wall thereof and comprising an indicator electrode and a reference electrode and arranged in the chamber at the end thereof opposite said inlet defining means.

9. An apparatus for use in the coulometric titration of flowing fluids, having wall means defining a substantially round chamber, rotatable agitator means adjacent one end wall of the chamber, means defining an inlet to the chamber and arranged adjacent said agitator means, baffle means arranged substantially helically on said chamber-defining wall means and extending along at least a part thereof and projecting into the chamber, means defining an outlet from the chamber and arranged at the end wall of the chamber opposite said rotatable agitator means, means defining an electrode inlet duct, a working electrode in said electrode inlet duct defining means, an auxilary electrode in said outlet defining means outside the chamber, said working electrode and said auxiliary electrode forming a titration electrode system, and a measuring electrode system comprising an indicator electrode and a reference electrode and arranged in the chamber at the end thereof opposite said inlet defining means, said working electrode and said measuring electrode system being arranged substantially opposite each other at the end of the chamber opposite said agitator means.

References Cited

UNITED STATES PATENTS

| | | | |
|---|---|---|---|
| 2,621,671 | 12/1952 | Eckfeldt | 204—195 |
| 3,032,493 | 5/1962 | Coulson et al. | 204—195 |
| 3,208,926 | 9/1965 | Eckfeldt | 204—195 |
| 3,341,430 | 9/1967 | Wickerham et al. | 204—1.1 |
| 3,131,133 | 4/1964 | Barendrecht | 204—195 |

JOHN H. MACK, *Primary Examiner.*

T. TUNG, *Assistant Examiner.*

U.S. Cl. X.R.

204—195; 324—29